United States Patent
Peoples

[19]

[11] Patent Number: 6,134,312
[45] Date of Patent: *Oct. 17, 2000

[54] METHOD FOR REMOTELY CONTROLLING A TELEPHONE LOOP/CHANNEL FROM ANOTHER TELEPHONE LOOP/CHANNEL

[76] Inventor: John Terrance Peoples, 14 Blue Jay Ct., Warren, Somerset County, N.J. 07059

[ * ] Notice: This patent is subject to a terminal disclaimer.

[21] Appl. No.: 09/016,673

[22] Filed: Jan. 30, 1998

Related U.S. Application Data

[63] Continuation-in-part of application No. 08/413,267, Mar. 30, 1995, Pat. No. 5,719,925, which is a continuation-in-part of application No. 08/204,087, Mar. 2, 1994, Pat. No. 5,438,616.

[51] Int. Cl.[7] .............................. H04M 3/42; H04M 7/00
[52] U.S. Cl. ..................... 379/201; 379/202; 379/211; 379/219
[58] Field of Search .................................. 379/201, 202, 379/203, 207, 211, 212, 219, 220, 221, 355, 142, 67.1, 88.01, 88.28

[56] References Cited

U.S. PATENT DOCUMENTS

| | | | |
|---|---|---|---|
| 5,452,347 | 9/1995 | Iglehart et al. | 379/211 X |
| 5,719,925 | 2/1998 | Peoples | 379/211 X |

*Primary Examiner*—Harry S. Hong

[57] ABSTRACT

Techniques for establishing a connection between a calling party and a called party using the processing of a controller located on a customer premises and served by two incoming telephone loops or ISDN-type channels so as to minimize telephone costs, preserve privacy, and provide heretofore unavailable services. After a first telephony connection is established with the calling party over the secondary loop/channel, the calling party provides control information to the controller. The controller utilizes the control information to establish a connection over the primary loop/channel, and the primary and secondary loops/channels are bridged so that the calling party may monitor the call progression on the primary loop/channel and provide supplemental control information, as needed.

11 Claims, 8 Drawing Sheets

METHOD FOR REMOTELY CONTROLLING A TELEPHONE LOOP/CHANNEL FROM ANOTHER TELEPHONE LOOP/CHANNEL

CROSS-REFERENCE TO RELATED APPLICATION

This is a continuation-in-part of application of Ser. No. 08/413,267, filed Mar. 30, 1995, now U.S. Pat. No. 5,719,925, which is a continuation-in-part of Ser. No. 08/204,087 filed Mar. 2, 1994, now U.S. Pat. No. 5,438,616.

BACKGROUND OF THE DISCLOSURE

1. Field of the Invention

This invention relates to telephony-type communication systems and, more particularly, to establishing call connections by remotely accessing each customer individually and then remotely completing the connection between the customers.

2. Description of the Background Art

The art is devoid of teachings or suggestions pertaining to customer-premises equipment in connection with techniques for: (1) minimizing the cost of toll-type calls for the customer by remotely utilizing two incoming telephone lines serving the customer premises; or (2) preserving the privacy of a called telephone number and, hence, a called party, as placed by a calling party by remotely using the two incoming telephone lines serving the given customer premises; (3) providing heretofore unavailable services such as remotely canceling call forwarding to a first call-forward number and remotely establishing call forwarding to a second call-forward number; or (4) presenting the caller identification (caller ID) of the customer's premises as if the customer were at the customer premises even though the customer may, in fact, be calling from a remotely located premises. (Even though the techniques are couched in terms of two incoming telephone lines to a party, those with ordinary skill in the art will readily appreciate equivalents to such an arrangement of two incoming telephone lines, such as a single Integrated Services Digital Network (ISDN) wherein two B-channels may serve as the equivalent of two incoming lines.)

Thus, a need exists in the art for such services, encompassing both circuitry and methodology, for providing such cost-minimizing, privacy-preserving techniques, or telephony services which have no counterpart in the presently-existing telecommunications technology.

A first patent representative of the technological field of the present invention is U.S. Pat. No. 5,251,250 issued to Obata et al (Obata). In Obata, there is shown a method and circuitry for storing a caller's telephone number as data in a memory wherein callers' telephone numbers received during an automatic telephone answering state can suitably be retained as data. Later, a user having local access to the memory bank can display the stored telephone numbers to learn about the callers' telephone numbers placed during the user's absence.

A second patent representative of the field is U.S. Pat. No. 4,724,539 issued to Hiskes. As disclosed in Hiskes, a customer is assumed to subscribe to the "third-party" calling service offered by a local exchange carrier. In order to allow the use of the third-party feature, a device is placed at the customer premises which imitates the actions of a person at the customer premises who desires to initiate a third-party or conference call between two other remotely located parties. The device is remotely controlled by a calling party to instruct the device to initiate the conference call to the other parties (one of whom may be the original calling party). The ability to provide such a remote conferencing capability is dependent upon the availability of third-party calling service in the area serving the customer; moreover, the use of a single subscriber line is limiting in the types of new services that may be controlled remotely.

A third patent representative of the field is U.S. Pat. No. 5,452,347 issued to Iglehart. The disclosure of Iglehart is directed towards an enhanced telephone which, in view of the totality of its teachings, is connected on one hand to a standard subscriber loop homing on a conventional, public central office and, on the other hand, to a private line homing on a private branch exchange—in contrast to the inventive subject matter of the present invention wherein the controller and two standard subscriber loops (analog or ISDN) home on the same public central switching office. A primary focus of the Applicant's present invention is to remotely invoke the features of the conventional public central office (call forwarding, cancel call forwarding, and so forth), either directly or upon call-back. The Iglehart disclosure teaches away from access to and control of central-office provided features a conventional central office; in fact, the converse to the inventive subject matter herein is true in Iglehart.

Finally, the subject matter of the Applicant's earlier patent application, now U.S. Pat. No. 5,438,616, discloses techniques for remotely controlling one loop from another loop for the case in which two telephone numbers are stored in a controller by initiating a call to the controller from a remotely-located party. Upon storage of the two telephone numbers, the remotely-located party is disconnected from the controller, and the controller re-establishes a connection with the remotely-located party via one telephone number over the first loop, and calls out on the second line using the second telephone number. The subject matter of the present invention relates to enhancements to these basic operating principles.

SUMMARY OF THE INVENTION

These shortcomings and other limitations and deficiencies are obviated in accordance with the present invention by circuitry which couples two customer premises loops or ISDN B-channels to thereby mitigate telephone cost and preserve privacy as well as effecting new services heretofore not contemplated.

In accordance with the broad aspect of the present invention, a calling party and a called party are interconnected with a controller over two loops terminating on the controller at a customer premises; generally the calling party is at a location remote from the called party and the controller, with the called party is also at a location remote from the controller. The controller is configured with: an off-hook functionality for the first loop; a call answering functionality for the second loop; and a bridging functionality to interconnect both the first loop and the second loop. In response to an incoming call on the second loop from the remotely-located calling party, a call connection is established over the second loop via the controller between the calling party and the controller using the call answering functionality for the second loop. Then the first loop is bridged to the second loop using the bridging functionality. Next, dial tone is drawn over the first loop via the controller upon establishing the call connection using the off-hook functionality of the first loop. Finally, control information is transmitted by the remotely-located calling party over the second loop to control the first loop.

In accordance with another aspect of the present invention, the calling party remotely directs the controller to effect a call-back over the second loop to a number provided by the calling party. The calling party hangs up, and a call-out functionality for the second loop calls back the calling party. Once the calling party answers then, as above, the first loop is bridged to the second loop using the bridging functionality. Next, dial tone is drawn over the first loop via the controller upon establishing the call-back connection using the off-hook functionality of the first loop. Finally, control information is transmitted by the remotely-located calling party over the second loop to control the first loop.

In accordance with yet another aspect of the present invention, the first loop is arranged to provide caller identification signals to the controller upon any incoming calls to the controller over the first loop. The controller stores a list of caller identifications for which it is desired to "call-forward" to a remote party accessible via a call-out on the second loop. If the caller identification of the incoming call is on the list, the second loop initiates a call-out using its call-out functionality to a telephone number pre-stored in the controller. Once the call on the second loop is answered, the call on the first loop is answered and the first and second loop are bridged so the remote parties may converse. From the point of view of the party calling on the first loop, it appears as if the party on the second loop is physically at the location of the controller but, in fact, the second party may be at any remote location.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in providing telephony-type services.

Figure 1:
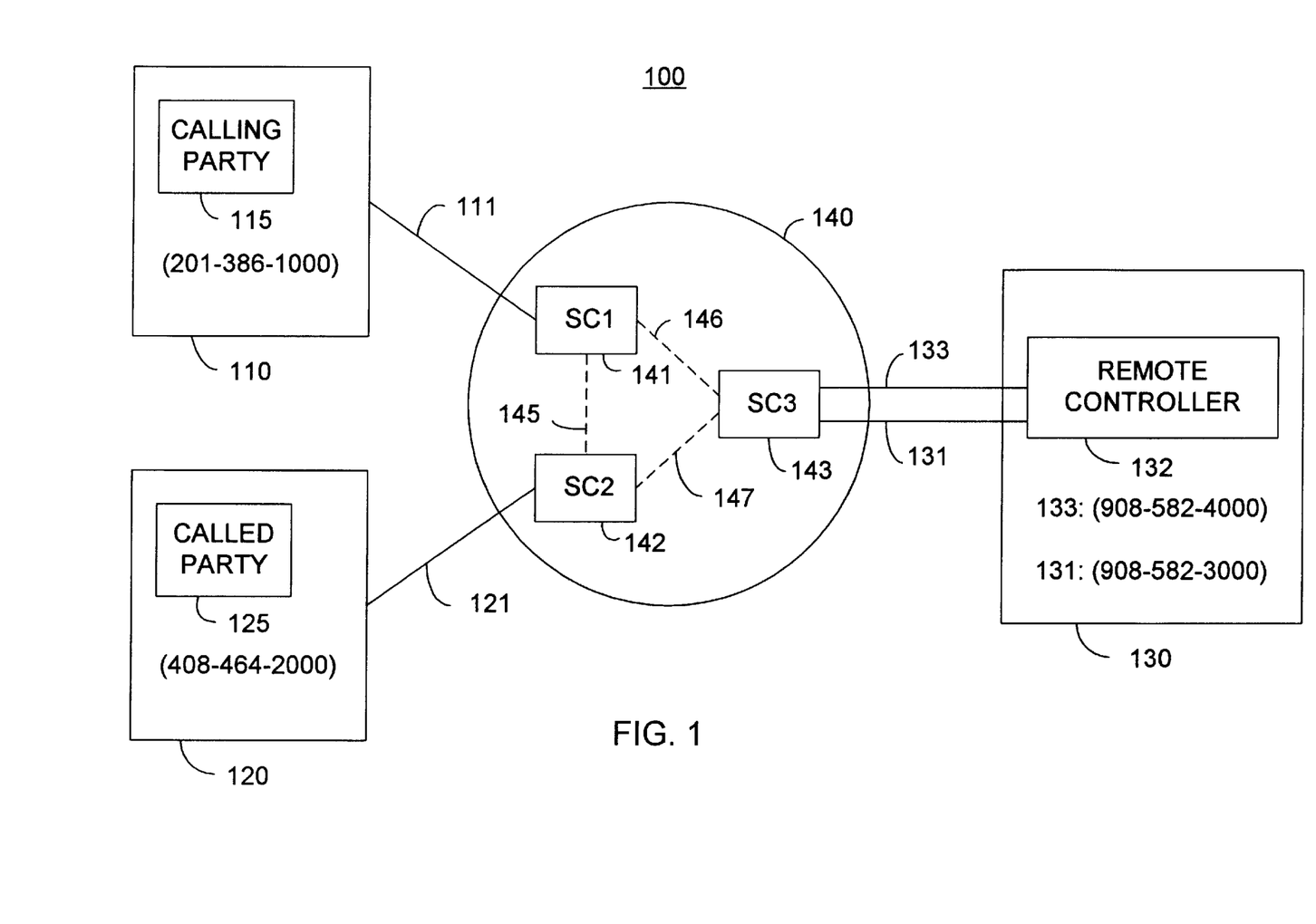
FIG. 1 illustrates a high-level block diagram of the telephone loop switching controller used to interconnect a calling party to a called party using two separate subscriber loops.

With reference to FIG. 1, there is shown high-level block diagram 100 illustrating public switched telephone network 140 for interconnecting calling party at location 110 to called party 125 at location 120; the description of the operation of FIG. 1 is useful for contrasting the conventional interconnecting arrangement with an arrangement in accordance with the present invention (which will be described in detail shortly). Calling location 110 is connected to telephone network 140 via subscriber loop 111 terminating on switching center 141 (SC1), whereas called location 120 is connected to telephone network 140 via subscriber loop 121 terminating on switching center 142 (SC2). Illustratively, subscriber loop 111 is assigned a telephone number given by 201-386-1000 (area code-NNX-exchange number), whereas subscriber loop 121 is assigned telephone number 408-464-2000; for the sake of specificity, area code 201 is in New Jersey and area code 408 is in California.

Conventionally, if calling party 115 desires to communicate with called party 125, calling party 115 "keys-in" or dials the telephone number (408-464-2000) assigned to subscriber line 121, i.e., location 120, of called party 125, and the call is setup by linking serving center 141 with serving center 142 via INTER-LATA connection 145 which may be provided by an inter-exchange carrier (IXC). The cost for such an established call generally depends upon the manner in which calling party 115 initiated the call. For example, calling party 115 may have directly "keyed-in" the telephone number assigned to the location of called party 125 (1-408-464-2000) from a private residence so the call will be billed to the calling telephone number (201-386-1000); on the other hand, calling party 115 may have arranged to have the called billed to his/her calling card by first "keying in" 0-408-464-200 and then "keying in" the credit card number to be billed. If the call was placed from a public "coin" telephone (not shown) at location 110, the total bill may also include a component charged by the local provider of the "coin" telephone equipment.

It is now supposed, in accordance with one aspect of the present invention, that calling party 115 desires to communicate with called party 125 but further desires to have the call automatically charged to another telephone number, say 908-582-3000 at location 130, without intervention and/or knowledge on the part of the IXC or the local exchange carrier (LEC); this number is the primary telephone number assigned to remote location 130 which is served from switching center 143 (SC3) of network 140 via subscriber line 131. It may be that calling party 115 (whose "home" location is the one assigned 908-582-3000) is merely visiting a private residence assigned telephone number 201-386-1000 and does not wish to impose upon the owner of the residence by having a potentially large toll charge billed directly to such owner, but would rather shift the burden of the cost to himself/herself by having the call billed to his/her primary home telephone number, namely, 908-582-3000 (which is also in New Jersey). If remote location 130 is served by two telephone lines 131 and 133 being assigned primary telephone number 908-582-3000 and secondary telephone number 908-582-4000, respectively, then it is possible to mitigate the telephone charges to 201-386-1000 by introducing remote controller 132 at location 130 and configuring controller 132 to operate generally according to the following steps:

(a) establishing a connection with calling party 115 via the secondary loop 133 (that is, calling party 115 "keys-in" 1-908-582-4000 from location 110, thereby interconnecting party 115 to remote controller 132 via loop 111, INTER-LATA path 146 linking switching centers 141 and 143, and loop 133);

(b) automatically bridging party 115 to primary loop 131 via bridging circuitry in controller 132 for communication;

(c) drawing dial tone on primary loop 131;

(d) transmitting control information from the remotely-located calling party by "keying-in" information, such as 1-408-464-2000, to place an outbound call over primary loop 131; and (e), upon termination of the bridged call, controller 132 automatically resets to accept another incoming call, and connections over loops 131 and 133 are taken down (or alternatively, another outbound call may be made over loop 131 with the connection to the remotely-located calling party being maintained).

From this description, it is clear that the only charge to the owner of telephone number 201-386-1000 is an INTRA-LATA call to secondary telephone number 908-582-4000, which is typically a "local call". The significant cost is borne by the party assigned both telephone numbers 908-582-3000 and 908-582-4000 (in this example, visiting calling party 115) since the INTER-LATA call is presumably more expensive, and which results from the desired connection between party 115 at location 110 and party 125 at location 120. (It is worthwhile to note that the foregoing description has advantageously utilized two, remotely bridged telephone lines to provide this service—often two such lines are available because a customer at location 130 has a second line for use by children in the household (the so-called "teenager" line) or because a customer has a modem or a fax terminating a separate line so that the customer does not to tie-up the first line for long periods. Also, such a party may have ISDN installed for computer usage, and the ISDN service may by advantageously utilized as heretofore described).

In another aspect of the present invention, it is supposed that location 110 is the work location of party 115, location 130 is party's 115 home premises, and party 125 at location 120 is someone whose identity party 115 desires to keep in confidence, that is, party 115 does not wish to have the telephone number (408-464-2000) of party 125 appear on any telephone log for the originating telephone number (201-386-1000); party 125 may be, for example, party's 115 doctor or lawyer. In accordance with a variation of the technique described above, party 115 directs controller 132 to call back party 115 over loop 133 using a telephone number inputted by the calling party—for this example, party 115 inputs telephone number 201-386-1000 and hangs up. Controller 132 registers this phone number, and initiates a return call to party 115 via loop 133 using telephone number 908-582-4000. Thus, the only number that will appear on the telephone log at location 110 will be the home telephone number of party 115. The call back to party 115 and the call to party 125 are listed only in the telephone log of telephone numbers 908-582-4000 and 908-582-3000, respectively, serving premises 130.

Figure 2:
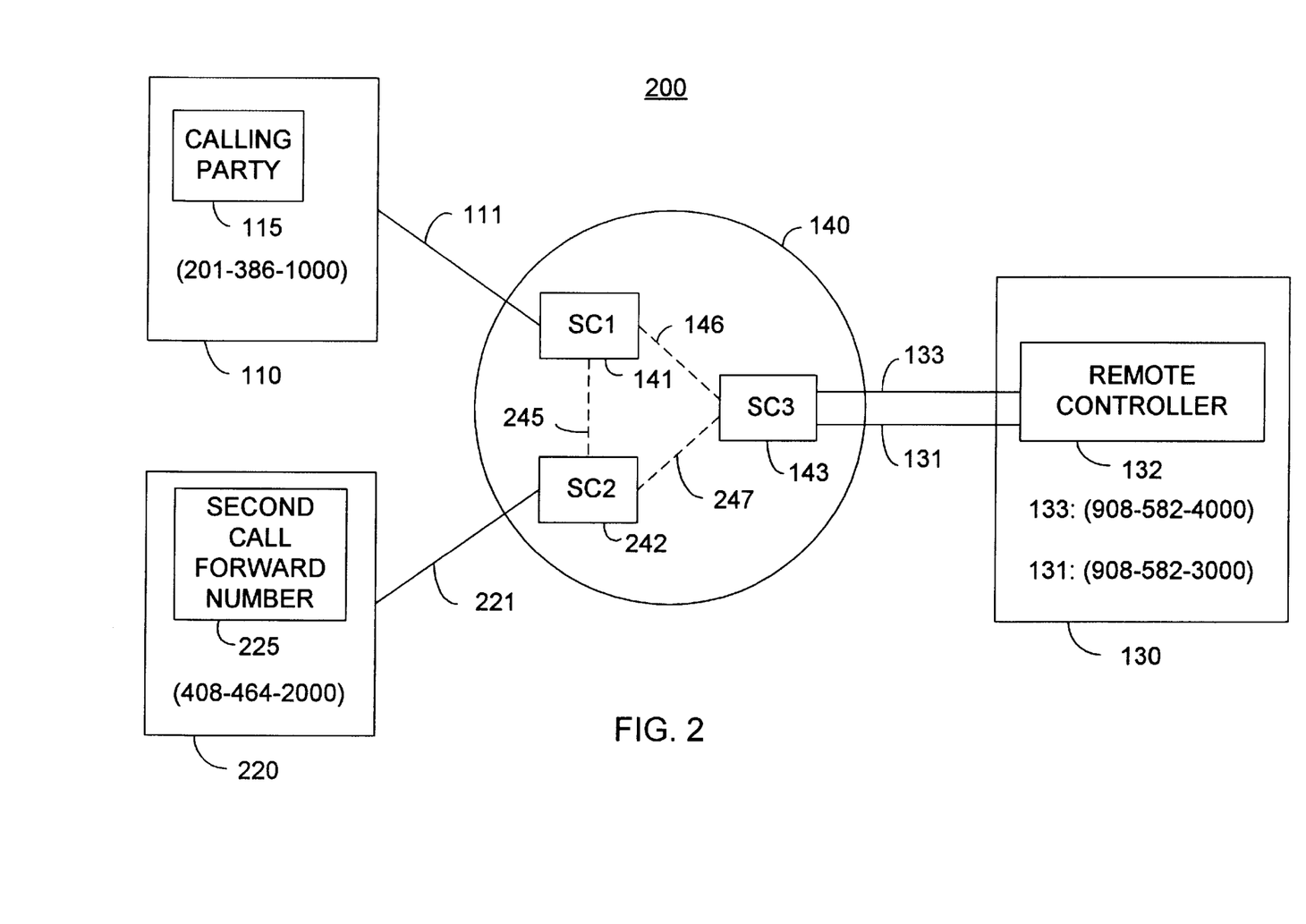
FIG. 2 illustrates another high-level block diagram of the telephone loop switching controller to control a first subscriber loop remotely over a second subscriber loop in accordance with another aspect of the present invention.

By way of illustrating another heretofore unavailable service, reference is made to the high-level block diagram 200 of FIG. 2. With respect to FIG. 2, it is assumed that the telephone number assigned to calling location 110 (i.e., 201-386-1000) is a call forwarding number for a call originally placed to telephone number 908-582-3000 assigned to location 130. That is, any call incoming to original number 908-582-3000 is re-directed, via the call forwarding service provided by switching center 143 (SC3), to telephone number 201-386-1000. Such re-direction is typically effected by a party at location 130, having assigned telephone number 908-582-3000, invoking the call forwarding code at location 130 (e.g., by keying-in *72), and then following a protocol leading to the keying-in of the call forwarding number 201-386-1000. Suppose further that the party originally keying-in the information at location 130, and who is the owner of the two numbers assigned to location 130 (i.e., 908-582-3000 and 908-582-4000) has traveled to location 110 and is now identified as party 115. In this situation, the party normally associated with location 130 invoked the call forwarding service knowing that he/she would be temporarily be at location 110 and he/she wishes to respond to calls incoming to location 130.

If party 115 now desires to leave location 110 and travel to location 220, there presently is no existing self-directed service which will allow party 115 to cancel call forwarding to telephone number 201-386-1000 and re-direct calls incoming to 908-582-3000 to 201-464-2000 at location 220. (Some local exchange carriers do offer a call-forwarding, cancel call-forwarding service for a fee each time the service is invoked—the party must call an 800 number and provide the information to a customer attendant—which thus costly and time-consuming). With controller 132 arranged as described below and two incoming loops to controller 132, namely, loops 131 and 133, such a service is readily provided. Initially, calling party, while at location 110 and before leaving for the new location 220, places a call to secondary telephone number 908-582-4000 at location 130 via telephone number 201-386-1000 from location 110. Controller 132 is arranged to operate generally according to the following steps:

(a) in response to the incoming call over loop 133 having assigned telephone number908-582-4000, establishing a call connection with calling party 115 (that is, calling party 115 "keys-in" 1-908-582-4000 from location 110, thereby interconnecting party 115 to remote controller 132 via loop 111, LATA path 146 linking switching centers 141 and 143, and loop 133);

(b) drawing dial tone over the primary loop 131 upon establishing the call connection;

(c) bridging loops 131 and 133;

(d) upon establishing a bridged connection between the two incoming loops, party 115 transmits control information to be carried in an outgoing direction over loop 131 (such as first keying-in the call forwarding cancel code (*73), followed by re-involving of the call forwarding code (*72), followed by responses to the call forwarding protocol to re-direct calls to 201-464-2000 (party 225 at location 220), as accessed via loop 221 homing on serving center 242); and (e) upon termination of the bridged call, controller 132 automatically resets to accept another incoming call.

Whereas the above has been described in terms of immediately drawing dial tone on the primary loop (step (b) above), it is possible to arrange controller 132 with a menu of operations which may be remotely selected. When so arranged, the remotely calling party is first provided with this menu of operations, which may be provided and/or made accessible in any number of standard formats. For example, a stored voice may request that the party calling over the secondary loop: "press the 1 key if a call-back is desired" (followed, of course, by a secondary menu which could signal for the call back number only, or a call back number as well as another calling number as per the description of FIG. 1); "press the 2 key if an immediate dial tone on the primary loop is desired" (as per the description of FIG. 2); and so forth. It is noted that with such a menu of operations, a menu of sub-operations may be associated with each of the operations. Thus, as in the second case above, once the 2-key is struck, the sub-operation of drawing dial tone on the primary loop is immediately invoked.

According to this arrangement wherein controller 132 is implemented with a menu of operations, controller 132 would generally operate according to the following steps:

(a) in response to an incoming call on the secondary loop 133 from a calling party (e.g., party 115), establishing a call connection over the secondary loop 133 via controller 132 between the calling party and controller 132 (via loop 133, SC3 and SC1 and path 146, and loop 111):

(b) providing a menu of selectable operations accessible to the calling party via controller 132;

(c) remotely selecting one of the menu operations by the calling party, each of the menu operations defining at least one sub-operation to be carried out via the primary subscriber loop 131;

(d) controlling the primary subscriber loop 131 via controller 132 in response to the at least one sub-operation corresponding to the selected one of the operations, and (e) bridging the primary and secondary subscriber loops 131 and 133 to form a bridged connection so as to allow the calling party to monitor the primary loop 131 and, whenever required, to provide information to the primary loop 131.

In another variation of the present invention, primary loop 131 is arranged to transmit caller identification signals to controller 132 upon any incoming call. Controller 132 stores a list of caller identifications for which it is desired to "call-forward" to a remote party accessible via a call-out on secondary loop 133. If the caller identification of the incoming call is on the list, controller 132 initiates a call-out using its call-out functionality over secondary loop 133 to a telephone number pre-stored in controller 132. Once the call placed over secondary loop 133 is answered, the call on primary loop 131 is also answered and the first and second loop are bridged so the remotely-located parties may converse. From the point of view of the party calling on the first loop, it appears as if the party on the second loop is physically at the location of controller 132 and has answered the incoming call but, in fact, the second party may be at any remote location.

As is readily apparent in the foregoing overview descriptions of various embodiments of the present invention, controller 132 may be characterized as a remotely-controlled mini-switching/bridging center, located on a individual customer premises, which advantageously utilizes two incoming loops to foster new telephony services not implementable from a centralized switching center such as SC1, SC2, or SC3. Moreover, with the advent of the ISDN connecting a customer premises with a central switching office, it is no longer required that the customer lease two loops; rather, the two B channels of ISDN may serve the same function as the two separate loops, and bridging may be effected in analog mode or even digitally via a digital bridge. Accordingly, wherein the descriptions of the various embodiments focuses on two individual loops, those with ordinary skill in the art may readily contemplate how the inventive services may be implemented using ISDN technology.

Illustrative Embodiment of One Aspect of the Present Invention

1.) Circuit Description

Figure 3:
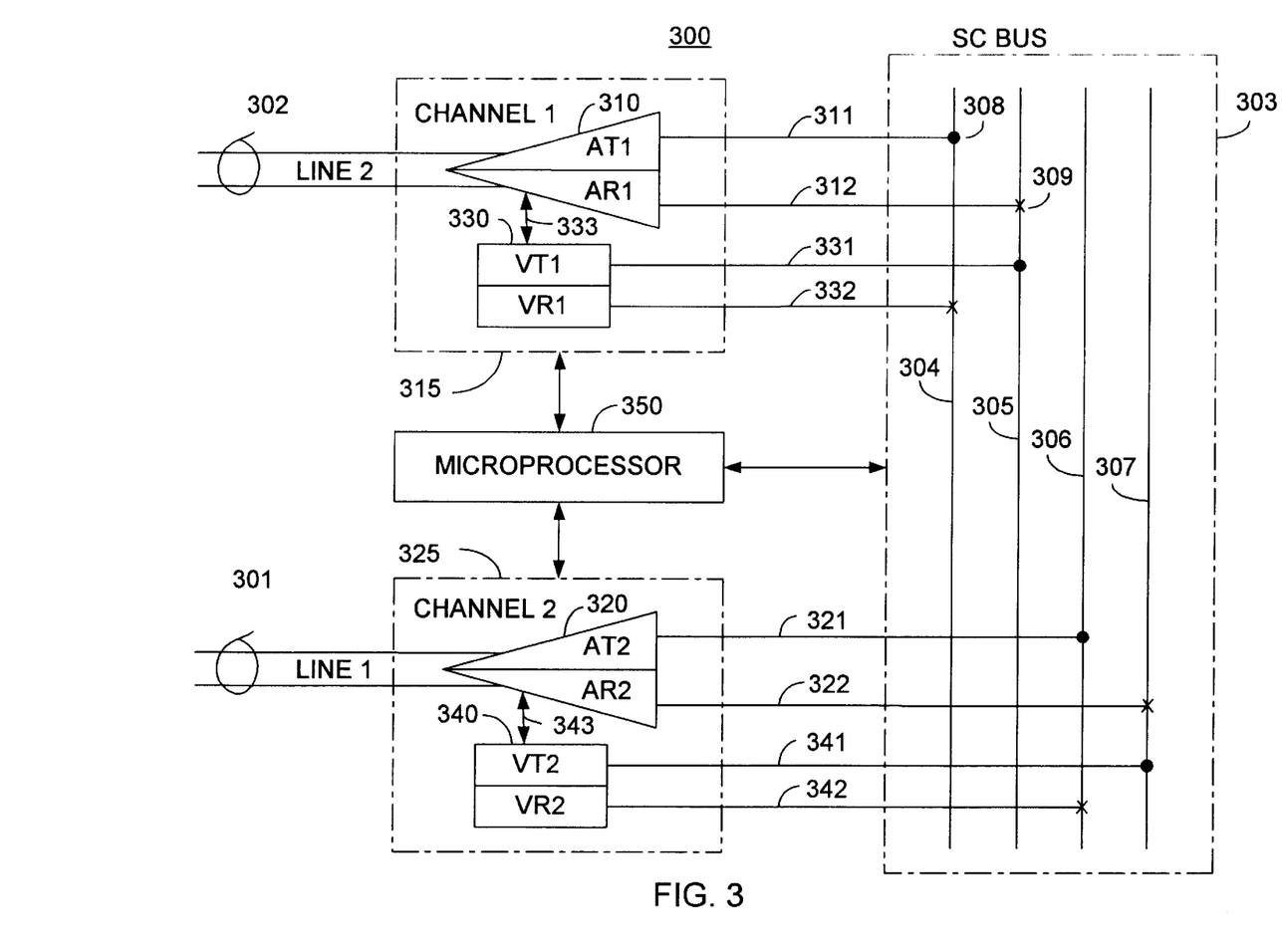
FIG. 3 is a block diagram of an illustrative embodiment of a controller which uses the two separate loops corresponding to the arrangement of FIG. 1.

With reference to FIG. 3, there is shown, in electrical block diagram form, MAnaginG Incoming Call (MAGIC) controller 300 connected to two separate incoming telephone lines. Telephone subscriber lines 301 and 302 are conventional loops that are connected to a conventional telephone central office (not shown but, e.g., SC3 of FIG. 1) which offers standard "touch-tone" calling. To provide an operational description as well as a circuitry description of controller 300, the following describes one illustrative communication sequence as an incoming call arrives on line 302 (Line 2) from the calling party (such as party 115 in FIG. 1) so as to set-up and use controller 300. Other variations of the sequence are readily understood by one of ordinary skill in the art once the teachings and suggestions of the circuitry of FIG. 3 are comprehended.

Illustratively, controller 300 is implemented with an off-the-shelf programmable circuit board called the D41-ESC (hereinafter board 300 and controller 300 are used interchangeably) as provided by the Dialogic Corp. The board is built for computer telephony systems, and it fits into a single ISA slot in a PC system. There are 4 independent incoming channels—for the implementations of the present invention, only 2 of the channels are typically utilized (although it is possible to use the other 2 channels, for example, for call-out activity as well).

The board uses the so-called Signal Computing bus referred to by Dialogic as the SCbus™ connection. The SCbus connection allows for bi-directional transmitting/receiving over analog loop-start loops, as well as for the interconnection of a given analog receiver to a desired analog transmitter. Moreover, such functionalities as on-hook, off-hook, dialing, call tone analysis, ringing analysis, tone generation, and caller-ID are implemented on the board. The board uses a general-purpose microprocessor for control and signal processing. Thus, a desired special-purpose application is realized by programming the board using the offered functionalities. In what follows, only those features of the board for the special-purpose application illustrative of the present invention are described in detail—the documentation on the architecture and operation of the board is commercially available, and readily understood by one of ordinary skill in the art.

As depicted in FIG. 3, board 300 comprises: (a) first channel device 315 composed of first analog loop-start transmitter/receiver circuit 310 connected to line 302, and first voice transmitter/receiver circuit 330 coupled to analog circuit 310 via path 333; (b) second channel device 325 composed of second analog loop-start transmitter/receiver circuit 320 connected to line 301, and second voice transmitter/receiver circuit 340 coupled to analog circuit 320 via path 343; (c) SCbus 303, composed of four busses 304–307, coupled to channels 315 and 325; and (d) microprocessor 350 coupled to first channel 315, second channel 325, and SCbus 301 to control these channels and bus.

In turn, circuits 310 and 320 are composed of a transmitter portion (AT1 and AT2, respectively) and a receiver portion (AR1 and AR2, respectively). AT1 connects to bus 304 via signal path 311; this connection is fixed, that is, AT1 always connects to bus 304. Similarly, AT2 is always connected to bus 306. These fixed connections are shown by a bold dot at each interconnection point (e.g., dot 308 for path 311 and bus 304). Furthermore, circuits 330 and 340 are composed of a transmitter portion (VT1 and VT2, respectively) and a receiver portion (VR1 and VR2, respectively). VT1 connects to bus 305 via signal path 332; this connection is also fixed, that is, VT1 always connects to bus 305. Similarly, VT2 is always connected to bus 307. These fixed connections are again shown by a bold dot at each intersection.

In contrast, AR1 is movable to any bus, but when board 300 is initialized by system software, AR1 is connected to bus 305, that is, AR1 is said to "listen" to VT1. The movable aspect of AR1 is shown by an X at the interconnection (e.g., X 309) of path 312 and bus 305. Similarly, VR1 listens to AT1 on bus 304, AR2 listens to VT2 on bus 307, and VR2 listens to AT2 on bus 306.

The aforementioned state of board 300 is referred to as the initialized mode. There are other modes of operation depending upon the "listening" connections of the various receivers. One mode of particular interest is the so-called bridge mode wherein: (a) AR2 listens to AT1; and (b) AR1 listens to AT2. In the bridge mode, a voice conversation on line 302 is conveyed over line 301, and a voice conversation on line 301 is conveyed over line 302; thus, the bridge interconnection results in a full-duplex handling of both conversations.

Circuit 310 is arranged to go "off-hook" to draw dial tone on line 302. Also, an incoming ringing signal on line 302 can be detected via circuit 310. Circuit 310 has other desired functionalities, such as "on-hook" capability, DTMF tone detection, out-bound DTMF tone generation, as well as the ability to play a pre-recorded voice signal via VT1 as originated by circuit 330. Circuit 320 has the same functionality.

Circuits 330 and 340 have access to a set of pre-recorded voice signals which are stored as a voice file (e.g., *.vox file) in software. A plurality of *.vox files can be pre-recorded, stored, and recalled as needed. Any *.vox file can be played over loop 302 or 301, as needed, by VT1 and VT2, respectively.

2.) Operational Description

Figure 4A:
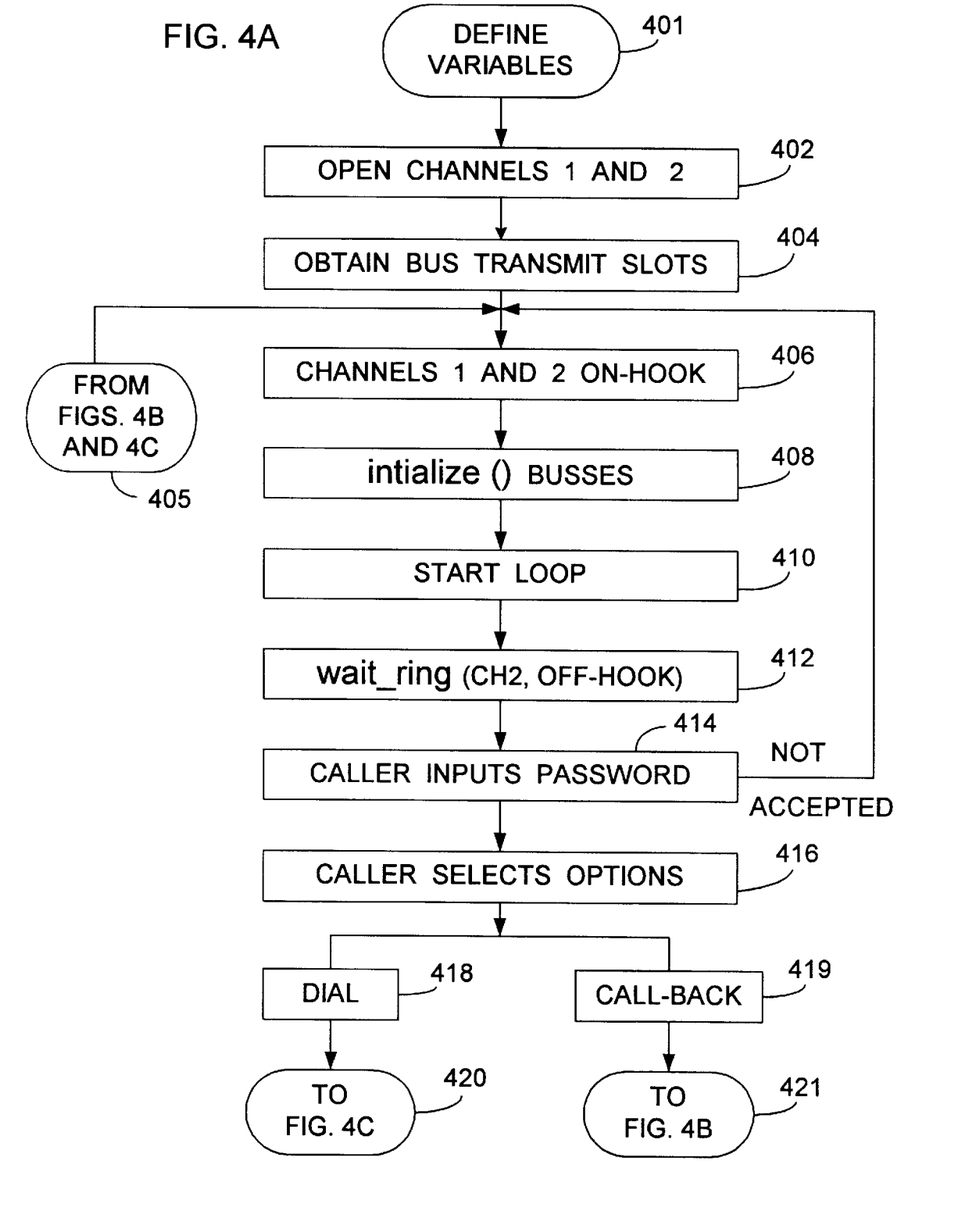
FIG. 4 is a flow diagram representative of the operation of the controller of FIG. 3.

With reference to the flow diagram of FIG. 4A, program variables used by the program controlling board 300 are defined (block 401); this stored program is the control program as executed by microprocessor 350. Then, board 300 is initialized which, in terms of the D41-ESC board of Dialogic, means that on-board channels 1 and 2 (synonymous with channels 325 and 315, respectively) are "opened", as per processing element 402. Furthermore, as depicted by processing block 404, the bus slots for AT1, AT2, VT1 and VT2 are assigned. Next, channels 1 and 2 are placed in the "on-hook" mode by processing block 406. Processing block 408 "initializes" circuits 310, 320, 330, and 340 so that: AR1 listens to VT1; VR1 listens to AT1; AR2 listens to VT2; and VR2 listens to AT2.

The "while loop" depicted by processing block 410 is next invoked with a "TRUE" argument. Then, a board-provided software function is invoked by processing block 412, namely, the "wait-ring" function. This function, as depicted, shows that channel 315 (CH2) is waiting for an incoming ringing signal, and when the ringing signal is detected, channel 315 will go off-hook (OFF-HOOK) to answer the incoming call in the analog loop-start mode. Thus, assume that a remotely-located calling party (e.g. party 115 at location 110 in FIG. 1) calls into controller 300 over line 302, such as by keying in a series of DTMF digits, that is, the telephone number associated with line 302. The call-answering functionality for line 302 as implemented by board 300 establishes a call connection between the remotely-located calling party and line 302.

Typically, in a practical system, the next number keyed in by the calling party is the party's so-called verification/confirmation code, referred to as the PASSWORD—successful entry of the PASSWORD allows the calling party to control board 300 from a distance. The PASSWORD assigned to the customer is selected off-line beforehand and can be stored by microprocessor 350. Presuming the set of digits keyed in by the calling party corresponds to the correct PASSWORD, then a pre-stored voice response (such as "password acceptable") is supplied to the calling party via VT1 over AR1. The acceptance of the PASSWORD alerts the calling party that controller 300 is ready to accept additional information, such as telephone number-type information.

If PASSWORD provided by the calling party is not correct, then the board 300 re-initializes to its standby state. This prevents unintended parties from invoking the actions of board 300.

Assuming that the PASSWORD is received correctly, the remote calling party may now invoke "options" by keying-in digits using the keypad of the remotely-located telephone, as depicted by processing block 416. One option is "dial" (block 418) and another option is "call-back" (block 419). If "call-back" desired, the processing as depicted by the flow diagram of FIG. 4B is invoked (by go-to block 421); if "dial" is invoked, meaning the remote calling party wishes to immediately draw dial tone and dial out over loop 301, then the processing as depicted by the flow diagram of FIG. 4C is invoked (by go-to block 420).

Figure 4B:
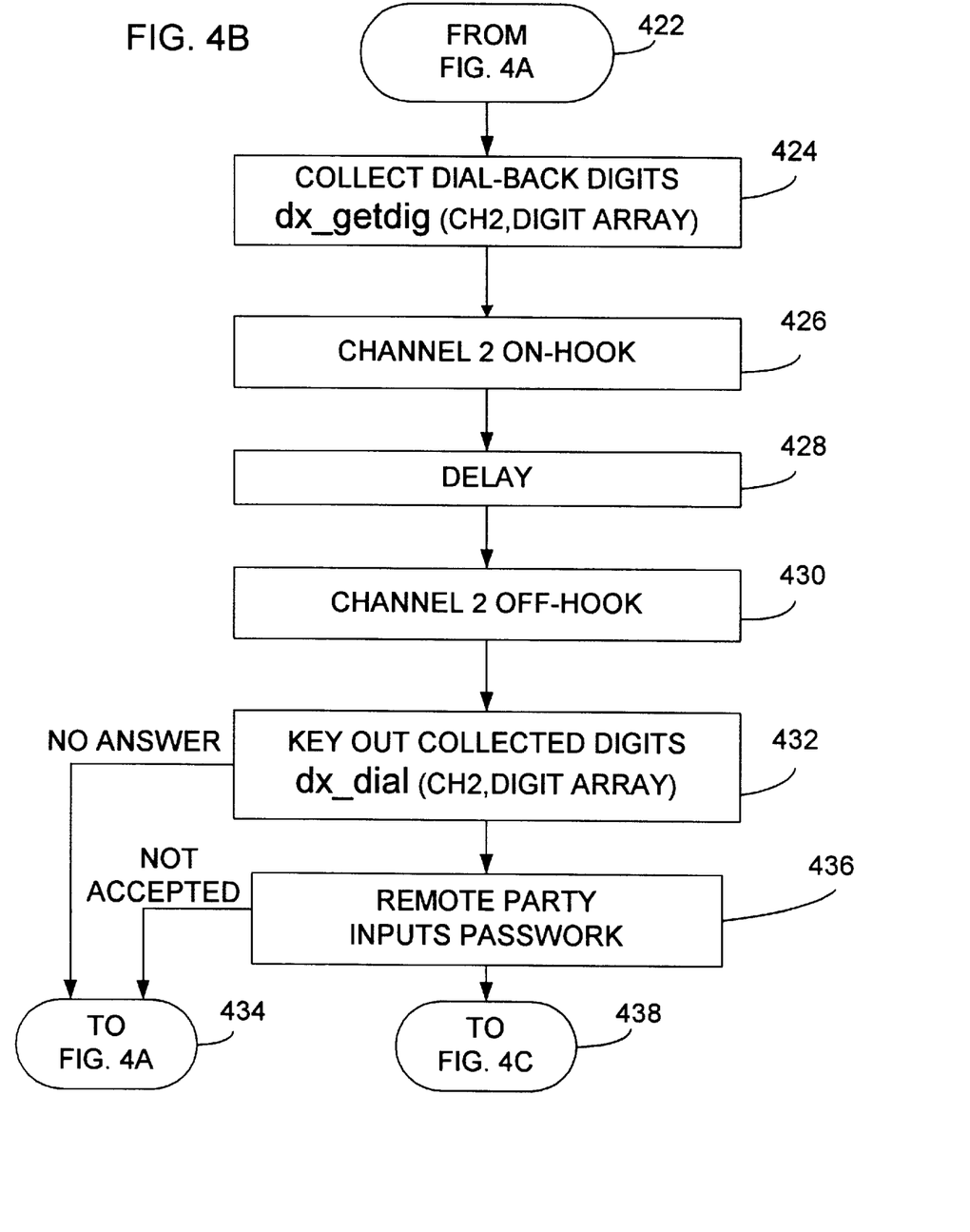

Referring now to FIG. 4B, upon arrival from FIG. 4A (input block 422), board 300 invokes the "collect digits" software subroutine (processing block 424) to collect digits input by the remote caller; in D41-ESC terminology, the digits are collected using the "dx_getdig(CH2, Digit Array)" routine. Upon collection of the digits, the remote caller hangs up. Channel 2 goes on-hook for a brief period to allow for restoration of the quiescent state of the serving office, and then channel 2 goes off-hook to place an outgoing call using the digits stored in the Digit Array; this sequence of actions is depicted by processing blocks 426, 428, and 430. Controller 300 keys-out the collected digits stored in the Digit Array over channel 2 using another D41-ESC software subroutine having the syntax "dx_dial(CH2, Digit Array)" (processing block 432).

Figure 4C:
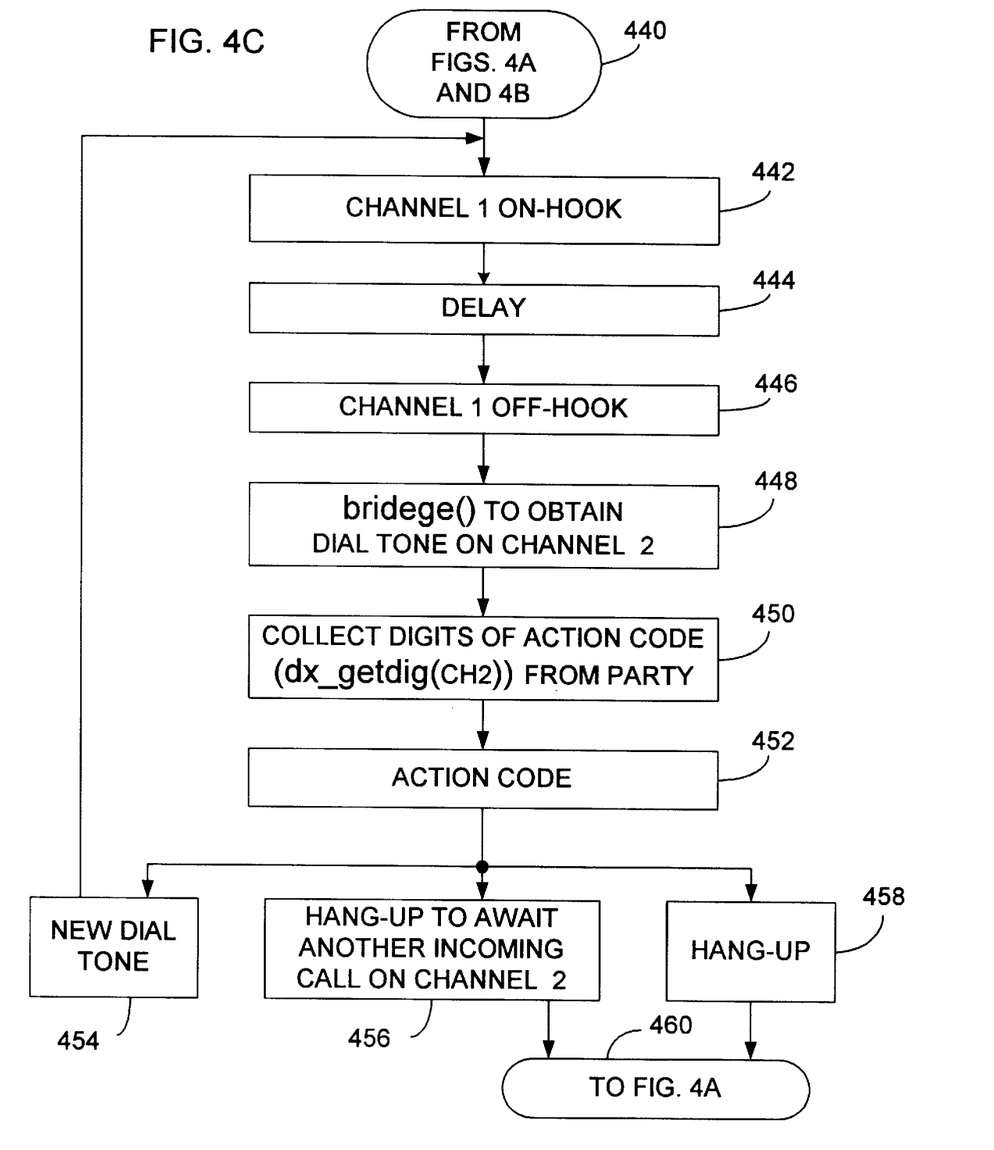

The remotely located calling party awaits the call-back, answers upon is call-back, and inputs the PASSWORD (block 436) to invoke the remainder of the processing depicted by FIG. 4C (via go-to block 438). If the call-back is not answered, then the processing reverts back to the standby mode (i.e., return to processing block 406 in FIG. 4A) to await re-initiation of the process (via go-to block 434. Similarly, if the PASSWORD is incorrect or a time-out occurs (e.g. wrong call-back number), then the standby mode is also invoked.

With reference to FIG. 4C, the "dial" processing depicted by this flow can be invoked from either FIGS. 4A or 4B, as evidenced by processing block 440. channel 1 is placed on-hook for a brief period to ensure the serving office is in its quiescent state with respect to loop 301, then channel 1 goes off-hook using the off-hook functionality of controller 300; this sequence is depicted by processing blocks 442, 444, and 446, respectively. Next, the "bridge()" function is invoked via processing block 448 to interconnect the analog loop start loops, that is, AR1 listens to AT2, and AR2 listens to AT1. Upon completion of bridging, the remote calling party hears the dial tone provided to line 301 via the bridging connection and line 302. The remote calling party now keys-in a series of DTMF digits as control information to control the action of loop 301. For example, the remote calling party can input a telephone number, a call-forwarding sequence, a cancel call forwarding sequence, speed dial, and so forth, just as if the calling party were physically present at the location of controller 300 and picked up the handset of a phone associated with loop 301.

Controller 300 also listens on the bridged connection for a sequence of special keyed-in digits which can then invoke some action; these sequences are called "action codes" (processing block 452). For example, one action code may be the sequence "*0", which invokes processing block 454 to hang up channel 1 for a brief period using the on-hook functionality, and then to take channel 1 off-hook again to draw a new dial tone. On the other hand, another action code may be "*1", which invokes processing block 456 to hang-up both channels 1 and 3, unbridged the channels, and revert back to the standby mode (via go-to block 460). Finally the remote calling party may just hang-up (block 458), which also invokes the standby mode.

Figure 5:
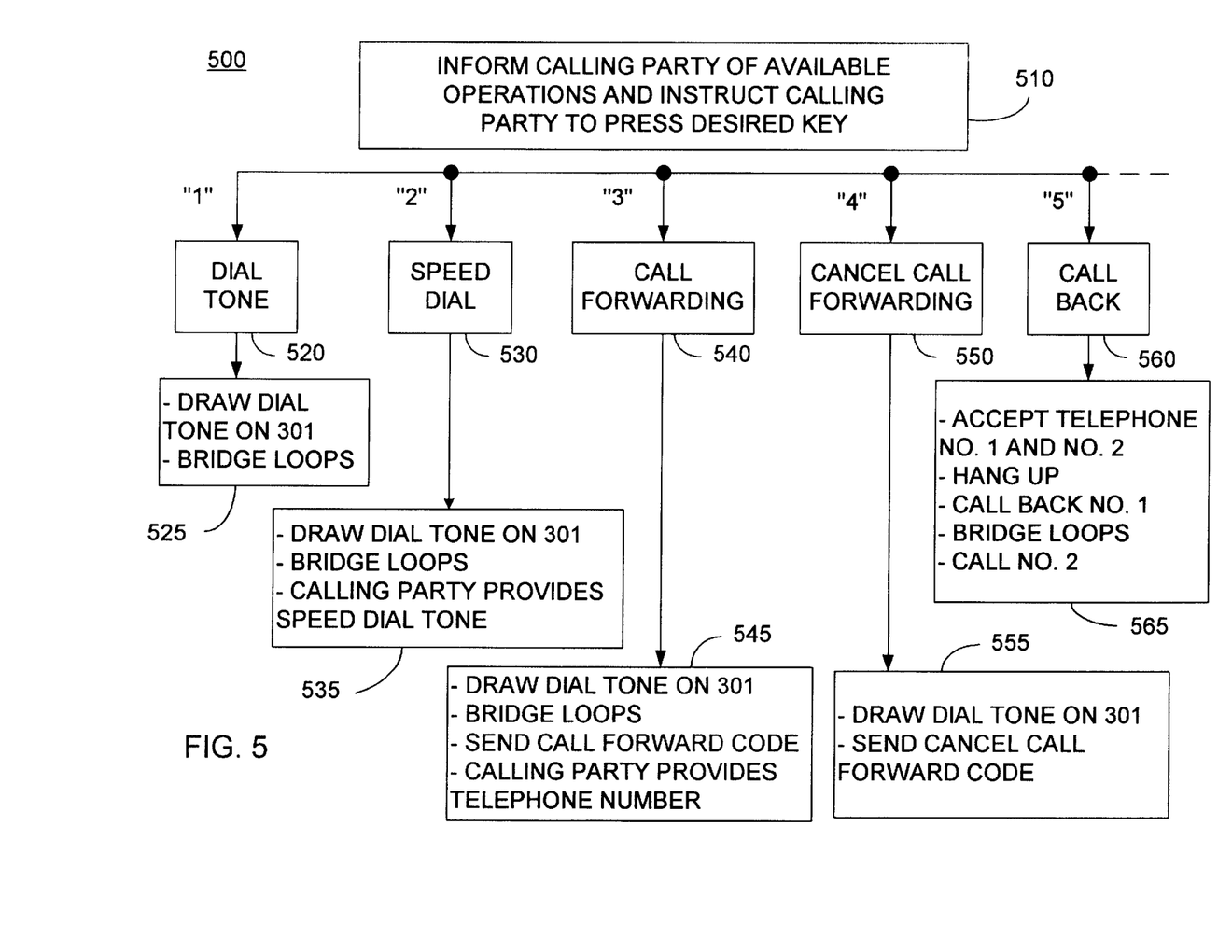
FIG. 5 is a flow diagram of an illustrative embodiment of remote access to a menu of selectable operations which, in turn, control the primary loop.

The embodiment of FIG. 4 has carried out, in effect, a menu of operations accessible to the calling party. It is readily contemplated by those of ordinary skill in the art that a menu of operations could be provided to the calling party immediately after verification of the password code. Examples of such menu items were: speed dial; cancel call forwarding; call forwarding; cancel call forwarding and re-input another call forwarding number; and so forth. Each menu item will normally have a set of sub-operations corresponding to each menu operation. For instance, for the speed dial operation, two sub-operations are expected, namely, draw dial tone on loop 301 and then enter the speed dial code upon receipt of dial tone on loop 301. The flow diagram 500 of FIG. 5 depicts the flow of such a menu of operations and sub-operations. As depicted by block 510, the calling party is informed of the various operations and then instructed to press the appropriate key for the desired operation. For instance, "press key 1" selects menu item "dial tone" as depicted by block 520 and invokes the sub-operations of drawing dial tone over loop 301 and bridging loops 301 and 302, as depicted by block 525. "Press key 2" selects menu item "speed dial" (block 530) and invokes the sub-operations of drawing dial tone over loop 301 and bridging loops 301 and 302, as well as sending the speed dial code over loop 301 (block 535) by the calling party. "Press key 3" selects menu item "call forward" (block 540) and invokes the sub-operations of drawing dial tone over loop 301 and bridging loops 301 and 302, as well as sending the call forward code over loop 301, and then awaiting the call forwarding telephone number from the calling party (block 545). "Press key 4" selects menu item "cancel call forwarding" (block 550) and invokes the sub-operations of drawing dial tone over loop 301 and bridging loops 301 and 302 (optional), as well as sending the cancel call forwarding code over loop 301 (block 555). "Press key 5" selects menu item "call back" (block 560) and invokes the sub-operations of accepting two telephone numbers, dropping the connection to the calling party, calling telephone number 1 over loop 302, calling telephone number 2 over loop 301, and bridging the loops 301 and 302. Obviously, other menu items may be added that are within the spirit and scope of the present invention.

Thus, there are other possible embodiments and/or configurations that are readily contemplated by one of ordinary skill in the art with respect to the various illustrative embodiments of the inventive controller; these include:
1. first telephone number already stored in the controller—such as the first party's work telephone number;
2. the controller "repeats" each telephone number such as by voice synthesis to first party and requests confirmation from first party before storing any telephone number;
3. the MAGIC controller can be programmed to call back the first or calling party a number of times in case the call-back telephone line is put in use from the time of initial hang-up to the call back; and
4. the service outlined above is envisioned as also being an applique to effect an improved "answering machine"-type device—similar to providing a code to turn off the usual recorder answering message and retrieve the incoming recorded messages—only this new or second code re-directs the "answering machine" processing.

Figure 6:
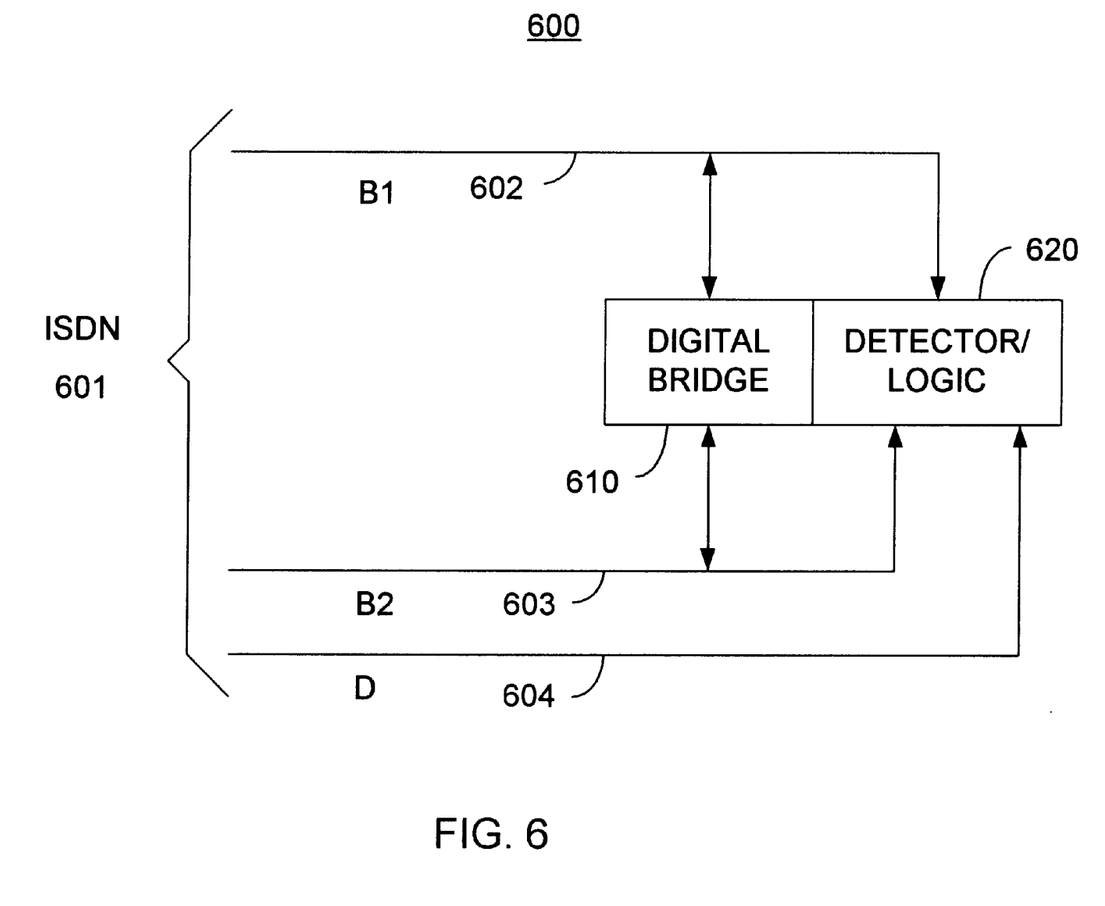
FIG. 6 is a high-level block diagram of the controller arranged to terminate an ISDN line having at least two B-channels, the controller being arranged with a line interface unit to effect bridging of the two B-channels.

Whereas the foregoing illustrative embodiments have been described in terms of two loops terminating in the controller, as already alluded to, it is readily contemplated that only one loop is required if the loop is an ISDN line providing 2B+D type service (at least). FIG. 6 depicts in block diagram form circuitry 600 for accomplishing all the aforementioned services via ISDN loop 601. With ISDN, the major difference between the embodiment described with respect to FIG. 3 and the embodiment of FIG. 6 is that the signals on the B channels are digital in format (whereas the previous description has been couched in terms of analog signals); thus it is not necessary to bridge the two incoming loops with an analog arrangement such as shown in FIG. 3. Rather, bridging may be accomplished digitally, that is, incoming bits on one B-channel are forwarded as outgoing bits on the other B-channel, and vice versa; digital bridge 610 represents such an arrangement. Coupling of the channels through digital bridge 610 is controlled by detector/logic circuitry 620, which also receives information from B-channels 602 and 603 and D-channel 604. Information from the D-channel allows for the byte-by-byte alignment of digital data on the B-channels, therefore effecting digital bridging in a straightforward manner. Moreover, all other functions described with respect to FIGS. 1–5 can be accomplished with ISDN once a conversion from digital to analog is effected in circuitry 600.

Although various embodiments which incorporate the teachings of the present invention have been shown and described in detail herein, those skilled in the art can readily devise many other varied embodiments that still incorporate these teachings.

What is claimed is:

1. A method for controlling a first subscriber loop from a second subscriber loop via a controller located at a subscriber premises wherein both the loops terminate in the controller and are served by the same public central switching office, the method comprising the steps of configuring the controller with: an off-hook functionality for the first loop; a call answering functionality for the second loop; and a bridging functionality to interconnect both the first loop and the second loop, in response to an incoming call on the second loop from a remotely-located calling party, establishing a call connection over the second loop via the controller between the calling party and the controller using the call answering functionality for the second loop, bridging the first loop to the second loop using the bridging functionality, drawing dial tone over the first loop via the controller upon establishing is the call connection using the off-hook functionality of the first loop, and transmitting control information as provided by the remotely-located calling party over the second loop to control the first loop.

2. The method as recited in claim 1 wherein the control information includes a telephone number to effect a second call connection over the first loop.

3. The method as recited in claim 1 wherein the control information includes either: (i) a call forwarding code and a telephone number for call forwarding; or (ii) a cancel call forwarding code; or (iii) a sequence of a cancel call forwarding code, an initiate call forwarding code, and a telephone number for call forwarding.

4. The method as recited in claim 1 further including the step of verifying a security code provided by the calling party prior to the step of drawing dial tone over the first loop.

5. A method for controlling a first subscriber loop from a second subscriber loop via a controller located at a subscriber premises wherein both the loops terminate in the controller and are served by the same public central switching office, the method comprising the steps of configuring the controller with: an off-hook functionality for the first loop; a call answering functionality, an on-hook functionality, and a call-out functionality for the second loop; and a bridging functionality to interconnect both the first loop and the second loop, in response to an incoming call on the second loop from a remotely-located calling party, establishing a first call connection over the second loop via the controller between the calling party and the controller using the call answering functionality for the second loop, receiving first control information as provided by the remotely-located calling party over the second loop for use by the call-out functionality for the second loop, terminating the first call connection using the on-hook functionality of the second loop, establishing a second call connection on the second loop with the remotely-located calling party using the first control information and the call-out functionality for the second loop, bridging the first loop to the second loop using the bridging functionality, drawing dial tone over the first loop via the controller upon establishing the second call connection using the off-hook functionality of the first loop, and transmitting second control information as provided by the remotely-located calling party over the second loop to control the first loop.

6. The method as recited in claim 5 wherein the second control information includes a telephone number to effect a third call connection over the first loop.

7. The method as recited in claim 5 wherein the second control information includes either: (i) a call forwarding code and a telephone number for call forwarding; or (ii) a cancel call forwarding code; or (iii) a sequence of a cancel call forwarding code, an initiate call forwarding code, and a telephone number for call forwarding.

8. The method as recited in claim 5 further including the step of verifying a security code provided by the calling party prior to the step of terminating the first call connection.

9. A method for controlling a first subscriber loop from a second subscriber loop via a controller located at a subscriber premises wherein both the loops terminate in the controller and are served by the same public central switching office, the method comprising the steps of configuring the controller with: a call answering functionality and a caller identification functionality for the first loop; a call-out functionality for the second loop; a bridging functionality to interconnect both the first loop and the second loop; and a memory having a predetermined list of caller-identifications, in response to an incoming call on the first loop, answering the incoming call using the call answering functionality and identifying the incoming caller-identification using the caller identification functionality for the first loop, if the incoming caller-identification is one from the pre-determined list, calling out over the second loop to a pre-determined call-out telephone number using the call-out functionality of the second loop, and bridging the first loop to the second loop using the bridging functionality.

10. A method for interconnecting first and second ISDN channels of an ISDN line via a controller located at a subscriber premises, the ISDN line being served by a public central switching office, the method comprising the steps of in response to an incoming call on the second ISDN channel from a remotely-located calling party, establishing a call connection over the second ISDN channel via the controller between the calling party and the controller, and supplying control information to the controller by the calling party to control operation of the first ISDN channel.

11. The method as recited in claim 10 further including, after the step of establishing, the steps of drawing dial tone over the first ISDN channel via the controller upon establishing the call connection, and bridging the first ISDN channel and the second ISDN channel via the controller, and wherein the step of supplying includes the step of transmitting control information by the calling party over the second ISDN channel to the first ISDN channel to control operation of the first ISDN channel.

* * * * *